(12) United States Patent
Fisher (10) Patent No.: US 12,182,077 B1
(45) Date of Patent: Dec. 31, 2024

(54) DISTRIBUTED LEDGER REGULATORY AUDITING SYSTEM AND METHOD

(71) Applicant: United Services Automobile Association (USAA), San Antonio, TX (US)

(72) Inventor: Jon Fisher, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/978,148

(22) Filed: Oct. 31, 2022

Related U.S. Application Data (63) Continuation of application No. 16/591,160, filed on Oct. 2, 2019, now Pat. No. 11,487,713.

(60) Provisional application No. 62/777,912, filed on Dec. 11, 2018.

(51) Int. Cl.
  *G06Q 40/00* (2023.01)
  *G06F 16/182* (2019.01)
  *G06Q 50/26* (2012.01)
  *H04L 9/06* (2006.01)

(52) U.S. Cl.
  CPC ......... *G06F 16/1837* (2019.01); *G06Q 40/00* (2013.01); *G06Q 50/26* (2013.01); *H04L 9/0637* (2013.01)

(58) Field of Classification Search
  CPC .... G06F 16/1837; G06Q 40/00; G06Q 50/26; H04L 9/0637
  See application file for complete search history.

(56) References Cited

U.S. PATENT DOCUMENTS

| | | | |
|---|---|---|---|
| 10,762,506 B1 | 9/2020 | Cash et al. | |
| 10,833,843 B1 | 11/2020 | Vijayvergia et al. | |
| 11,244,059 B2 | 2/2022 | Yoon et al. | |
| 2009/0276463 A1* | 11/2009 | Miller | G16H 10/20 |
| 2010/0185693 A1* | 7/2010 | Murty | G06F 16/40 |
| | | | 707/E17.055 |
| 2013/0198138 A1* | 8/2013 | Sambamurthy | G06F 16/219 |
| | | | 707/648 |
| 2014/0304830 A1* | 10/2014 | Gammon | G06F 21/6218 |
| | | | 726/27 |
| 2015/0347446 A1* | 12/2015 | Faitelson | G06F 16/176 |
| | | | 709/204 |
| 2016/0086279 A1 | 3/2016 | Williams | |
| 2016/0180022 A1* | 6/2016 | Paixao | H04L 63/1408 |
| | | | 705/3 |
| 2017/0308712 A1 | 10/2017 | Chari et al. | |
| 2018/0276270 A1* | 9/2018 | Bisbee | G06Q 30/0241 |

(Continued)

*Primary Examiner* — Tarek Chbouki
(74) *Attorney, Agent, or Firm* — Fletcher Yoder, PC (57) ABSTRACT

Techniques are described for creating and tracking audit trails, including regulatory compliance trails, using a distributed ledger. The techniques include determining, via the first processor, if data is to be provided for use in an audit, and if the data is to be provided then executing an audit trail routing system to route the data into at least one audit trail. The techniques further include storing, via the first processor, the data of the at least one audit trail in a least one block of digital distributed ledger system, and distributing, via the first processor, the at least one block among nodes of the digital distributed ledger system, wherein the digital distributed ledger system is configured to immutably store the data of the at least one audit trail.

18 Claims, 4 Drawing Sheets

(56) References Cited

U.S. PATENT DOCUMENTS

| | | | |
|---|---|---|---|
| 2018/0285594 A1 | 10/2018 | Jarvis, II et al. | |
| 2018/0285839 A1 | 10/2018 | Yang et al. | |
| 2018/0337769 A1* | 11/2018 | Gleichauf | H04L 9/0637 |
| 2019/0058595 A1 | 2/2019 | Hamasni et al. | |
| 2019/0180244 A1 | 6/2019 | El Kharzazi | |
| 2019/0180276 A1* | 6/2019 | Lee | H04L 9/3247 |
| 2019/0182257 A1* | 6/2019 | Lee | G06Q 10/06315 |
| 2019/0188706 A1 | 6/2019 | McCurtis | |
| 2019/0220829 A1 | 7/2019 | Ripley | |
| 2019/0229890 A1* | 7/2019 | Brehmer | H04L 9/088 |
| 2019/0272383 A1* | 9/2019 | Luttwak | G06F 21/604 |
| 2019/0332921 A1* | 10/2019 | Rodriguez | H04L 9/0643 |
| 2020/0027097 A1 | 1/2020 | Sargent | |
| 2020/0074117 A1 | 3/2020 | Camenisch et al. | |
| 2020/0074552 A1* | 3/2020 | Shier | G06Q 20/10 |
| 2021/0142235 A1* | 5/2021 | Hoover | G06Q 10/06395 |
| 2021/0211468 A1* | 7/2021 | Griffin | H04L 63/20 |
| 2022/0116401 A1* | 4/2022 | Lee | G06Q 20/10 |
| 2023/0291743 A1* | 9/2023 | Shua | H04L 63/102 |

* cited by examiner

DISTRIBUTED LEDGER REGULATORY AUDITING SYSTEM AND METHOD

CROSS-REFERENCE TO RELATED APPLICATIONS

This is a continuation application of U.S. patent application Ser. No. 16/591,160, entitled "DISTRIBUTED LEDGER REGULATORY AUDITING SYSTEM AND METHOD," filed Oct. 2, 2019, which claims priority from and the benefit of U.S. Provisional Application No. 62/777,912 entitled "DISTRIBUTED LEDGER REGULATORY AUDITING SYSTEM AND METHOD," filed Dec. 11, 2018, each of which is hereby incorporated by reference in its entirety for all purposes.

BACKGROUND

The present disclosure relates generally to distributed ledgers, and more particularly to systems and methods for regulatory auditing via a distributed ledger.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Banking, insurance, and/or investment systems may be designed to handle transactions providing services to a variety of users. Each user typically undergoes an intake process by which certain documents are presented, reviewed, signed, and then processed. For example, a bank may include certain documents that regulatory authorities may then use to audit and to verify that procedures have been followed as per legal and other requirements, to intake the user as a banking client. After intake, the users may then avail themselves of services provided by the bank, such as mortgage services, credit card services, checking services, and so on. Likewise, insurance systems may intake a set of user and include certain regulatory documents that may then be provided to regulatory authorities, among others. The techniques described herein may provide for improvement in systems and methods for auditing (e.g., auditing for regulatory compliance) of various systems, including but not limited to banking and/or insurance systems.

BRIEF DESCRIPTION

The techniques described herein are generally directed at distributed ledger-based systems that create and manage immutable trails of documents and/or transactions that may more efficiently provide for "dimensional" queries, such as audit-based queries. More particularly, embodiments of the present disclosure are directed to using a distributed ledger, such as a blockchain, to provide an immutable or otherwise unchangeable record of certain documents and transactions that may then be provided to certain entities, such as regulatory entities, for auditing compliance purposes. The distributed ledger may further provide for crypto security features and for records that may be verified to provide for enhanced security and trust. Additionally, certain transactions may be automatically stored, signed and updated through blockchain techniques, eliminating middlemen and providing for enhanced transactional efficiencies.

A client "file" may contain information related to an entity, including an individual, a corporation, a club, and so on. Entity information may include intake history. That is, when the client is first being processed to become banking client, an insurance client, an investment client, and so on, certain documents may be prepared and processed to conform to regulatory intake processes. For example, a banking client may be given a set of documents in which to enter identification information, address, and so on. Likewise, during banking operations, certain documents may be generated to provide to audit entities, such as documents that may comply with the Federal Deposit Insurance Corporation (FDIC) annual audit and reporting requirements. At the end of the client relationship, an exit process may also be used to terminate the relationship, which may result in various audit and reporting requirements. Similarly, insurance and/or investment entities may intake clients and/or terminate client relationships and then create a variety of documents during operations that may be provided to auditing authorities, including regulatory entities, external auditors, and/or internal auditors.

The techniques described herein may create immutable audit trail of documents, data, and/or transactional history. In certain embodiments, each trail may be stored in one or more distributed ledgers, such as blockchains and/or sidechains. The stored information may be provided via degrees of granularity and/or security to respective auditing entities. For example, rather than providing a file "dump" containing assorted documents, including documents that may not be relevant to a particular audit entity, each audit trail may instead provide relevant and verifiable documents geared towards enabling a more efficient and secure audit of information. Indeed, as further described below, certain systems and methods may automatically create audit trails which may then be securely provided to external auditing entities. The auditing entities may then more easily verify that certain information has been captured as per regulations and that the data stored comply with the regulations.

In a first embodiment, a system includes a first processor and a first memory communicatively coupled to the first processor. The memory stores instructions which, when executed, cause the first processor to perform operations including determining if data is to be provided for use in an audit, and executing an audit trail routing system to route the data into at least one audit trail if the data is to be provided for use in the audit. The instructions further cause the first processor to perform operations including storing the data of the at least one audit trail in a least one block of digital distributed ledger system, and distributing the at least one block among nodes of the digital distributed ledger system, wherein the digital distributed ledger system is configured to immutably store the data of the at least one audit trail.

In a second embodiment, a method performed by at least one processor includes determining, via the at least one processor, if data is to be provided for use in an audit, and executing an audit trail routing system to route the data into at least one audit trail if the data is to be provided for use in the audit. The method further includes storing, via the at least one processor, the data of the at least one audit trail in a least one block of digital distributed ledger system, and distributing, via the at least one processor, the at least one block among nodes of the digital distributed ledger system, wherein the digital distributed ledger system is configured to immutably store the data of the at least one audit trail.

In a third embodiment, one or more non-transitory computer-readable storage media, is provided, the media storing instructions which, when executed, cause at least one processor to perform operations including determining if data is to be provided for use in an audit, and executing an audit trail routing system to route the data into at least one audit trail if the data is to be provided for use in the audit. The instructions further cause the at least one processor to perform operations including storing the data of the at least one audit trail in a least one block of digital distributed ledger system, and distributing the at least one block among nodes of the digital distributed ledger system, wherein the digital distributed ledger system is configured to immutably store the data of the at least one audit trail.

In general, implementations of innovative aspects of the subject matter described in this specification can be embodied in an electronic distributed ledger that may include one or more audit trails. The distributed ledger may additionally include information and transactions for an entity or entities such as banking entities, insurance entities, and/or investment entities related to the audit trails For example, a first entity (e.g., an institution such as a bank) may enter into a relationship with a second entity (e.g., a client). Certain aspects of the relationship, for example intake of the client, may be captured and encrypted as an audit trail as further described below. The encrypted audit trail may then be stored as part of a distributed ledger. The distributed ledger may provide for a secure, immutable system for maintain the audit trail(s). When desired, the encrypted audit trails may be verified by a third entity (e.g., audit entity), for example, via certain cryptographic techniques. The third entity may navigate the audit trail and verify that certain processes have been met, such as regulatory processes used to intake clients, processes used when terminating client relationships, and also that the information provided meets certain regulatory limits, such as a list of transactions over a $10,000 limit for banking clients.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. Through use of digital distributed ledgers, compliance with regulations for certain processes, such as banking process, insurance processes, investment processes, and the like, may be automated and made more efficient and less costly. Audit trails may be crated, which may provide for immutable evidence of certain stored records and transaction. Accordingly, the digital distributed ledger implementations may provide an inexpensive, reliable, secure mechanism for storing and sharing auditable information, thus making efficient use of processing power, memory, storage space, network bandwidth, and/or other computing resources.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Embodiments of the present disclosure are directed to systems, devices, methods, and computer-readable media for creating, maintaining, and tracking auditable information using a distributed ledger, resulting in one or more audit trails. An audit trail may include information, such as documents used during client intake, banking records, life insurance records, vehicle information, property information, transaction history, and the like, useful in establishing an auditable repository for use by internal auditors as well as be regulators. Information stored in the audit trail(s) may be tracked using a distributed ledger system, such as a system that includes one or more blockchains. The blockchain(s) provide immutable and secure data storage, which may be distributed across a plurality of computing systems or nodes. As new transactions occur, the new transactions may be included in the distributed ledger system, thus "growing" the audit trail throughout the lifetime of the entity (e.g., client) being tracked. The distributed ledger system, such as one or more blockchains, may be used to store the information, including new transactions, more efficiently and inexpensively. The distributed ledger system also provides security, such that only authorized individuals and/or processes can access the data stored on the distributed ledger system. The distributed ledger system also provides immutability, such that data records written to the distributed ledger may not be changed or removed once written.

In certain embodiments, a blockchain may be used as a public or private audit ledger of all auditable transactions that have been executed for the tracked entity. The blockchain may grow as new blocks are added based on a new set of transactions. In some examples, a single block is derived from multiple transactions. In general, blocks are added to the blockchain in a linear, chronological order by one or more computing devices in a peer-to-peer network of interconnected computing devices that execute a blockchain protocol. The peer-to-peer network may be described as a plurality of interconnected nodes, each node being a computing device that uses a client to validate and to relay transactions to other nodes. Each node may maintain a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities should agree on which transactions have actually occurred, and in which order. For example, should two entities observe different transaction histories, they will be unable to come to the same conclusion regarding the validity of a transaction. The blockchain techniques described herein enable all entities to come to an agreement as to transactions that have already occurred, and in which order. As described in further detail below, a ledger of transactions for the audit trail is agreed to based on the amount of work (e.g., computing work such as hashing) required to add a transaction to the audit ledger (e.g., add a block to the blockchain). Blockchains may also employ other protocols, for example, that may define "work" differently. The work may be a computing task that may be difficult for any single node (e.g., computing device) in the peer-to-peer network to complete quickly, but is relatively easy for any node (e.g., computing device) to verify.

The peer-to-peer network may include multiple "miners" (e.g., computing devices) that add blocks to a blockchain based on the blockchain protocol. In general, multiple miners validate transactions that are to be added to a block, and compete (e.g., perform computing work, as introduced above) to have their respective block added to the blockchain. Validation of transactions includes verifying digital signatures associated with respective transactions. For a block to be added to the blockchain, a miner must demonstrate a proof of work before their proposed block of transactions is accepted by the peer-to-peer network, and before the block is added to the blockchain. In certain embodiments, a blockchain protocol include a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a "nonce" value (e.g., a random number used only once).

Multiple nodes may compete to hash a set of transactions and to provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner produce hundreds of thousands (or more) of hash values, before any one miner provides a qualifying hash value (e.g., at least the first four characters of the hash value are each zero).

In some embodiments, the distributed ledger or blockchain system can include one or more sidechains. A sidechain may be described as a blockchain that validates data from other blockchains. In some examples, a sidechain may provide for granularity of information so that different information "types", (e.g., banking information, insurance information, asset information, investment information, and so on) may be stored in a different sidechain linked to a main chain. The blockchain may be a public blockchain, such that data stored on the blockchain is generally accessible. The blockchain or portions of the blockchain may alternatively or additionally be a private blockchain, such that the stored data is accessible only to authorized individuals and/or processes on the blockchain. By providing for letters of credit via blockchains, as further described below, enhanced transactional efficiencies, security, and information flows may be provided.

Figure 1:
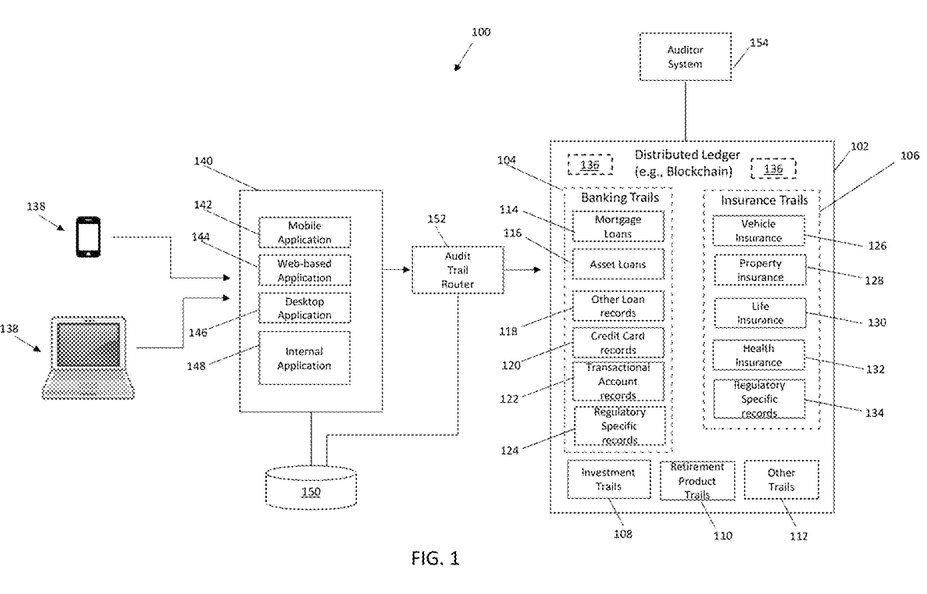
FIG. 1 depicts an embodiment of a system for audit trail creation and management, according to aspects of the present disclosure.

FIG. 1 depicts an embodiment of a system 100 for audit trail creation and tracking, according to aspects of the present disclosure. As shown in the example of FIG. 1, the system 100 may include a distributed ledger system 102 that may include one or more blockchains. The distributed ledger system 102 may be hosted on any suitable number of computing devices that operate as nodes for the distributed ledger system 102. Such nodes may be geographically distributed in any suitable number of locations.

The distributed ledger system 102 may store any appropriate number of data records of various types, including audit trail records 104, 106, 108, 110, and 112. Each of the audit trail records 104, 106, 108, 110, and 112 may include information that identifies a particular entity, such as an individual, a corporation, a club, and so on, for auditing purposes. For example, a banking audit trail 104 may include a unique identification, such as cryptographic key(s), certificates of trust, and the like, that uniquely identifies a specific banking entity or bank from other entities in the system 100. The banking audit trail 104 may additionally include or be linked to subrecords, such as mortgage loan information records 114, asset loan information records 116 (e.g., vehicle loan records, personal property loan records, personal loan records), other loan records 118 (e.g., student loans, business loans, miscellaneous loans), transactional account records 122 (e.g., checking accounts, savings accounts), and regulatory specific records 124. That is, while records 114-122 may be used by regulatory entities for auditing purposes, the records 114-122 may also be used by the banking entity for other purposes, such as to provide loans, credit transactions, checking transactions, and so on. Regulatory specific records 124 may be single use, that is, the records 124 may be records that are specified by certain regulations, such as FDIC regulations, Sarbanes-Oxley Act of 2002, Title 12 United States Code (U.S.C.) Section 363 Annual Independent Audits and Reporting Requirements, state regulations, and so on.

The insurance audit trail 106 may include a unique identification, such as cryptographic key(s), certificates of trust, and the like, that uniquely identifies a specific insurance entity from other entities in the system 100. The insurance audit trail 106 may additionally include or be linked to subrecords, such as vehicle insurance records 126 (e.g., car insurance, motorcycle insurance, recreational vehicle insurance), property insurance records 128 (e.g., home insurance, personal property insurance, renters insurance), life insurance records 130, health insurance records 132, and regulatory specific records 134. The regulatory specific records 132 may include records to conform to certain regulations, such as Health Insurance Portability and Accountability Act of 1996 (HIPAA), National Association of Insurance Commissioners (NAIC) regulations, state regulations, and so on.

Other audit trails may include the investment trails 108, and the retirement product trails 110. The investment trails 108 may include records related to investments in stocks, bonds, real estate investment trusts (REITs), commodities, futures, and so on. The investment trails 108 may additionally include records to comply with Securities and Exchange Commission (SEC) regulations, state regulations, and the like. Likewise, the retirement product trails 110 may include records related to individual retirement accounts (IRAs), retirement portfolios, and the like, to provide for retirement of one or more clients, as well as records to comply with Employee Retirement Income Security Act of 1974 (ERISA) regulations, SEC regulations, state regulations, and so on. Other trails 112 are also provided, which may be custom built to handle a variety of auditing processes and information.

Figure 2:
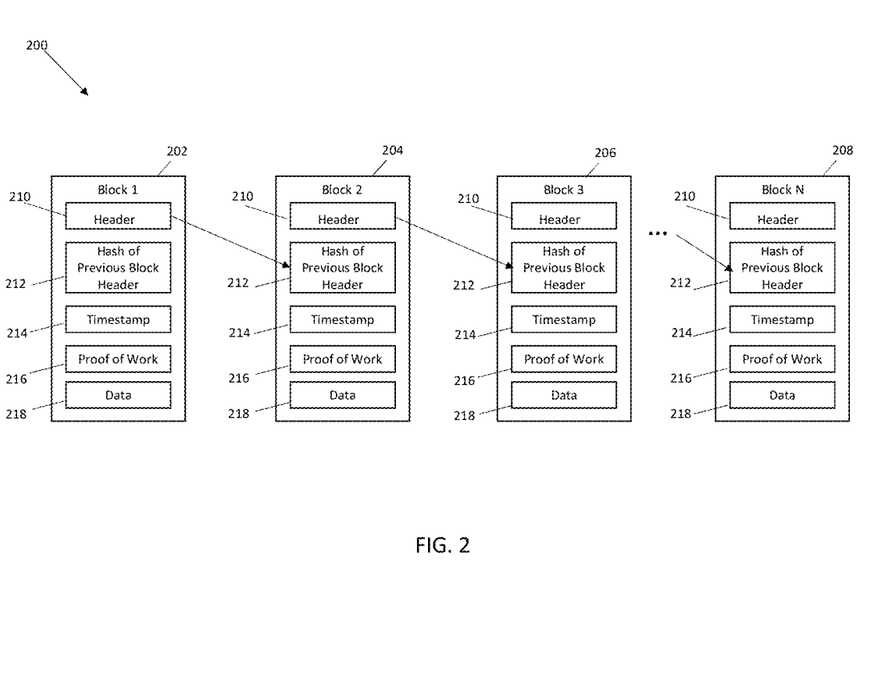
FIG. 2 illustrates a block diagram of an embodiment of a blockchain, according to aspects of the present disclosure.

In some embodiments, the distributed ledger system 102 may include a main blockchain 200 and one or more sidechains 136 that are linked to the main blockchain 200. In some embodiments, a sidechain 136 may be used to store certain record types. For example, a banking trail sidechain 136 may store only banking trail 104 records. Likewise, an insurance trail sidechain 136 may store only insurance trail 106 records 108. Similarly, sidechains 136 may be used to store investment trails 108, retirement product trails 110, and/or other trails 112. By using sidechains 136 dedicated to specific trail types 104-112, the techniques described herein may enable a more efficient record allocation in the distributed ledger 102. Further, in some embodiments, a side chain may be managed by other entities, for example, other audit trail side chains 136 may be managed by multiple parties, such as a bank, a mortgage broker entity, and so on.

One or more computing devices 138 may have access to the distributed ledger system 102. In some instances, the computing devices 138 may be nodes that host a portion of the distributed ledger. Alternatively, the distributed ledger may be hosted on computing device(s) other than the computing devices 138. The computing devices 138 may include any suitable type of computing device, including portable computing devices (e.g., smartphone, tablet computer, wearable computer, etc.), workstations, desktop computers, servers, and so on. The computing devices execute certain applications 140. For example, the applications 140 may provide for a new client intake process that leads a user through a set of documents used to input information for becoming a banking client, an insurance client, an investment client, a retirement products client, and so on. The applications 140 may include mobile applications 142 suitable for execution by mobile devices 138, web-based applications 144 that provide for a web interface, desktop applications 146 that may execute as native (e.g., operating system specific applications), and/or internal applications 148.

The internal applications 148 may include applications internal to an entity such as a bank, an insurance entity, an investment entity, and so on, that may be used for internal operations of the entity such as processing client intakes, data entry, preparing audit reports, and so on. In some embodiments, the applications 140 may be operatively coupled to one or more data repositories 150, which may be used to store and to retrieve data used during intake, client exit, and/or during regular business operations. In certain embodiments, an audit trail router system 152 may be operatively coupled to the data repositories 150 to extract information to create and/or grow the audit trails 104-112. That is, certain information in the data repositories 150 may be information useful in auditing, and thus, the information may be extracted from the data repositories 150 and stored as audit trails 104-112. Additionally or alternatively the audit trail router system 152 may be incorporated as part of the applications 140 (e.g., as a component of the mobile application 142, the web-based application 144, the desktop application 146, and/or the internal application 148) and used to create and grow the audit trails 104-112. In yet other embodiments, the audit trail router system 152 may be provided as an add-on (e.g., external to the applications 140) and may interact with the applications 140 via application programming interfaces, messaging protocols, and the like to crate and grow the audit trails 104, 112.

An auditor system 154 is also shown. The auditor system 154 may be operatively coupled to the distributed ledger system 102 for use in auditing operations. For example, the auditor system 154 may include cryptographically secure techniques to identify secure users of the auditor system 154 and to gain access to data that may have been cryptographically encrypted in the audit trails 104-112. The auditor system 154 may then view information found in the audit trails 104-112 to provide for automated auditing support. For example, The audit system 154 may generate an automated audit report suitable for verifying compliance with banking regulations (e.g., FDIC regulations, Sarbanes-Oxley regulations), insurance regulations, investment regulations (e.g., SEC regulations), and so on.

Use of a distributed ledger-based system 102 (e.g., blockchain system) provides for audit trail creation and maintenance that is fast, inexpensive, ubiquitous, secure, and immutable. Accordingly, use of the distributed ledger system enables implementations to forego the need for a middleman that may act as a broker of certain information. The records included in the audit trails 104-112, once written, will remain part of the distributed ledger and be retrievable at any time. Indeed, the records of the audit trails 104-112 may only grow, and thus provide for an immutable, time-based view of the information stored therein. Accordingly, embodiments enable the audit trails 10-4-112 to be stored on the distributed ledger 102 in a manner that is more secure, immutable, and readily accessible (e.g., auditable) than traditional files stored in vulnerable paper form at banks, escrow agencies, investment agencies, insurance agencies, and so on.

FIG. 2 is a diagram depicting an embodiment of the blockchain 200. In the depicted embodiment, the blockchain 200 is illustrated as having multiple blocks 202, 204, 206, and 208. The block 202 (first block in the blockchain 200)

may have been created, for example, and allocated as a special starting block. The block 202 may include a unique header 210 uniquely identifying the block 202 from other blocks in the blockchain 200. Because the block 202 is the first block in the blockchain 200, a hash of a previous block header 212 may be set to zero. A timestamp 214 may include the date of creation for the block 202, and a proof of work section 216 may include certain "work" that proves that a "miner" has performed work suitable for the creation of the block 202 and/or to verify transactions in the blockchain 200. The work section 216 may vary based on a protocol used to create the blockchain 200. For example, a bitcoin protocol may use a Merkle tree. The Merkle tree may be a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from our verified blockchain 200, and so on, down the tree. In other words, there's no way to create a fake value that would hash to our expected Merkle tree value (e.g., value stored in section 216 of the block 202), thus creating a single value that proves the integrity of all of the transactions under it.

Data, such as records included in the audit trails 104-112, may be stored in a section 218 (and/or in another section). In certain embodiments, a new block may be created when a new record for any of the audit trails 104-112 is to be created. For example, a new mortgage loan trail 114 record may result in the creation of a new block. In another embodiment, empty blocks may be first created and then assigned to new records for the audit trails 104-112. When a new block is created, the block will receive a new header 210 uniquely identifying the new block. As mentioned earlier, a peer-to-peer network may include multiple "miners" (e.g., computing devices 138) that add blocks to the blockchain 200 based on the blockchain protocol. In general, multiple miners validate transactions or data 218 that are to be added to a block, and compete (e.g., perform computing work, as introduced above) to have their respective block added to the blockchain 200. Validation of transactions and/or data includes verifying digital signatures associated with respective transactions and/or data 218. For a block to be added to the blockchain 200, a miner must demonstrate a proof of work before their proposed block of transactions is accepted by the peer-to-peer network, and before the block is added to the blockchain 200. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block (e.g., hash 150) in the blockchain 200, details of the transaction(s) or data 218 that are to be included in the to be created block, and a "nonce" value (e.g., a random number used only once).

Multiple nodes may compete to hash a set of transactions and to provide the next block that is to be added to the blockchain 200. The blockchain protocol may provides a threshold hash to qualify a block to be added to the blockchain 200. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 200. Each miner provides the reference to the previous (most recent) block in the blockchain 200, details of the data or transaction(s) 218 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain 200. Consequently, the respective miner's block is broadcast across the peer-to-peer network (e.g., all devices 138 communicatively coupled to the system 102). All other miners cease work (because one miner was already successful), and all copies of the blockchain 200 are updated across the peer-to-peer network to append the block to the blockchain 200. Each miner produce hundreds of thousands (or more) of hash values, before any one miner provides a qualifying hash value (e.g., at least the first four characters of the hash value are each zero).

It is to be noted that any computing device, such as devices 138 may be miners. Accordingly, as new records for the audit trails 104-112 are created, new blocks are added to the blockchain 200, including blocks 202, 204, 206, and 208. Indeed, the blockchain 200 may continue to grow, storing new records for the audit trails 104-112. Because of the distributed nature of the peer-to-peer network created via the distributed ledger system 102, each node (e.g., computing devices 138) may include copies of the blockchain 200 and share copies of the blockchain 200 as new peers enter the peer-to-peer network. Each copy of the blockchain 200 may include verified information (e.g., records for the audit trails 104-112) for all or substantially all of the information tracked by the distributed ledger system 102. The information is secure, immutable, and more efficiently tracked as new assets get added via the distributed ledger system 102. Accordingly, relationships, transactions, or information between entities may be captured, as shown in FIG. 3.

Figure 3:
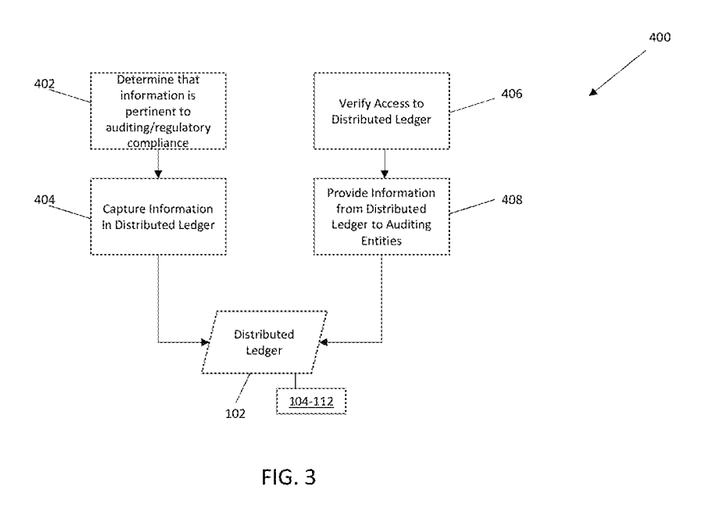
FIG. 3 is a flowchart depicting an embodiment of a process for the creation and storage of certain multi-entity data for audit trails, as well as for auditing of the audit trails, according to aspects of the present disclosure.

FIG. 3 is a flowchart depicting an embodiment of a process 400 for the creation and storage of certain multi-entity data for the audit trails 104-112, as well as auditing of the audit trails 104-112. The process 400 may be implemented as computer code or instructions executable, for example, by the computing devices 138. In the depicted embodiment, the process 400 may determine (block 402) if certain information is pertinent to auditing, such as information suitable for maintaining regulatory compliance. For example, the applications 140 and/or the audit trail router 152 may include logic that determines that certain information, such as information being entered and/or processed via the applications 140, may include auditing data. In certain embodiments, the applications 140 and/or the audit trail router 152 may use a list containing certain information entered via graphical user interfaces (GUIs), textual entries, and the like, that describe what information to route and where the information should be routed by the audit trail router 152. For example, banking information may be routed to the banking trails 104, insurance information may be routed to the insurance trails 106, investment information may be routed to the investment trails 108, retirement information may be routed to the retirement trails 110, custom information may be routed to the custom trails 112, and so on.

The process 400 may then capture (block 404) the information by storing the information in the blockchain 200 of the distributed ledger 102 as audit trails 104-112. For example, new blocks may be created in the blockchain 200 and section 218 of the new blocks may be used to store the information found pertinent to auditing. As mentioned earlier, storing information in the blockchain 200 may provide for fast, inexpensive, ubiquitous, secure, and immutable storage capabilities of auditing information, including information that is relevant to regulatory compliance (e.g., FDIC compliance, Sarbanes-Oxley compliance, SEC compliance, HIPAA compliance, and so on). In certain embodiments, cryptographic techniques such as private-public key techniques (e.g., Pretty Good Privacy (PGP) encryption) may be used to store the information in the distributed ledger 102. For example, certain regulatory entities, auditing entities, and the like, may share their public keys. The public keys in combination with a private key (e.g., private key held by applications 140 and/or audit trail router 152) may then be used to encrypt the information into the distributed ledger 102.

The process 400 may also provide for access to the audit trails 104-112. In the depicted example, the process 400 may verify (block 406) that certain entities are vetted to access the audit trails 104-112 included in the distributed ledger 102. Verification (block 406) may include using encrypted keys, security tokens, two-factor authentication, and so on, to determine that an entity requesting access to the audit trails 104-112 is authenticated. The process 400 may then provide (block 408) information stored in the audit trails 104-112 and/or the distributed ledger 102. For example, a regulatory entity representative (e.g., FDIC representative) may log into the auditor system 154 and then access the banking trails 104 to audit or verify regulatory compliance. In certain embodiments, the process 400 may provide (block 408) the information as a set of reports. For example, FDIC compliance reports, SEC compliance reports, Sarbanes-Oxley compliance reports, HIPAA compliance reports, custom reports, and the like, may be generated by querying respective audit trials 104-112 stored in the distributed ledger 102. Indeed, internal audit reports, regulatory compliance reports, external audit reports, and so on, may be provided. In this manner, the techniques described herein may capture and provide a variety of information for auditing purposes, such as information stored in the audit trails 104-112.

Figure 4:
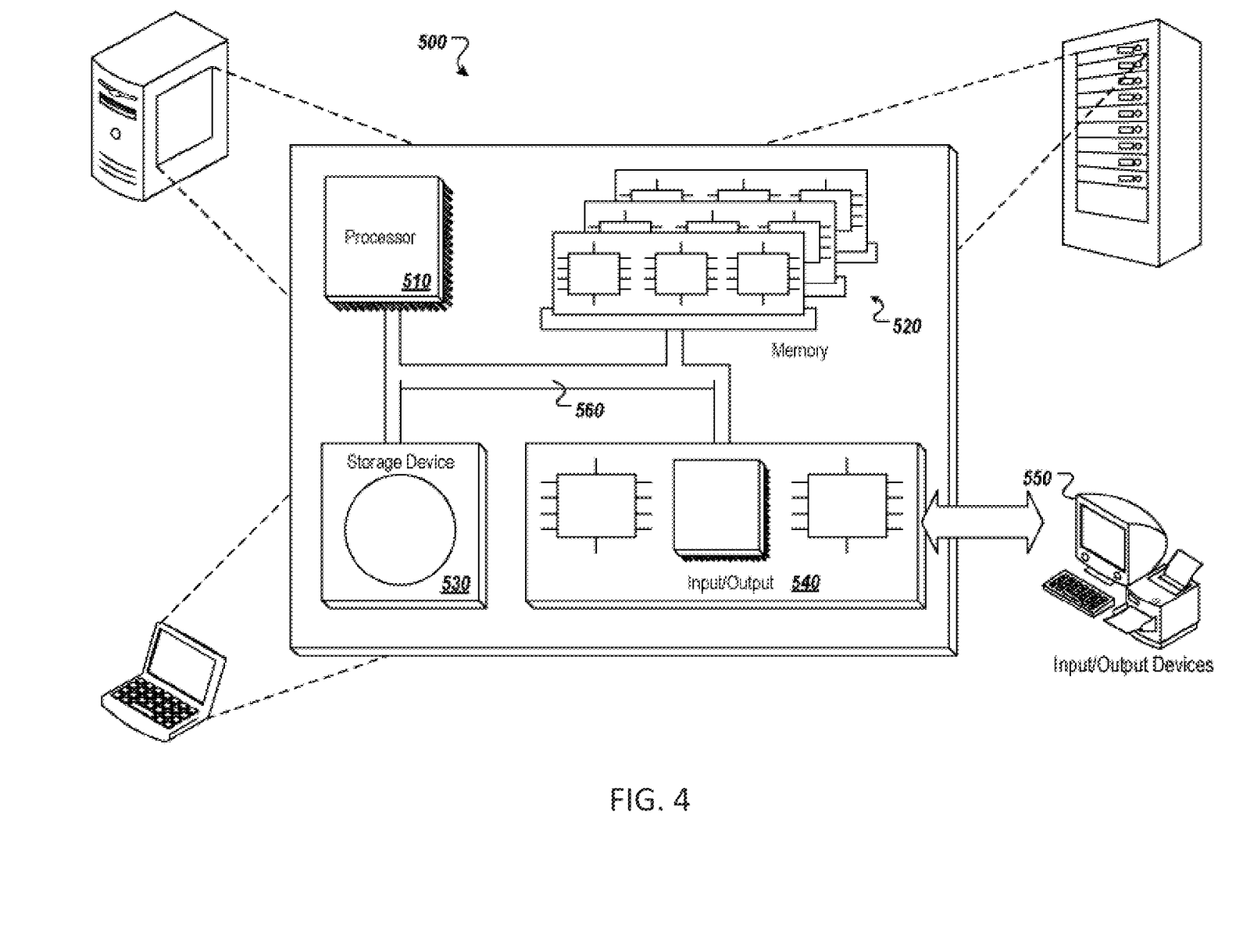
FIG. 4 depicts an example computing system, according to aspects of the present disclosure.

FIG. 4 depicts an example computing system, according to implementations of the present disclosure. The system 500 may be used for any of the operations described with respect to the various implementations discussed herein. For example, the system 500 may be included, at least in part, in one or more of the user device(s) 138, the node(s) that host the distributed ledger 102, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices 138 of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code), such as one or more programs used to implement the process 400, may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
   a processor; and
   a memory communicatively coupled to the processor, the memory storing instructions that, when executed, cause the processor to perform operations comprising:
   monitoring data input via an application;
   determining a first type of the data and a second type of the data;
   executing an audit trail routing system to route the first type of the data into a first audit trail of a plurality of audit trails based on the first type of the data and to route the second type of the data into a second audit trail of the plurality of audit trails based on the second type of the data;
   storing the first type of the data of the first audit trail in at least one first block of a digital distributed ledger system and the second type of the data of the second audit trail in at least one second block of the digital distributed ledger system;
   authenticating access of an audit entity to the digital distributed ledger system; and
   in response to authenticating the access of the audit entity to the digital distributed ledger system, providing the first audit trail to the audit entity via creating a report by querying the digital distributed ledger system, wherein the report comprises a regulatory compliance report.

2. The system of claim 1, wherein the operations comprise distributing the at least one first block and the at least one second block among nodes of the digital distributed ledger system, and wherein the digital distributed ledger system is configured to immutably store the first type of the data of the first audit trail and the second type of the data of the second audit trail.

3. The system of claim 1, wherein the first audit trail comprises a sidechain of the digital distributed ledger system linked to a main chain of the digital distributed ledger system.

4. The system of claim 3, wherein the sidechain of the digital distributed ledger system is dedicated to storing records of the first type of the data.

5. The system of claim 3, wherein each audit trail of the plurality of audit trails comprises a respective sidechain of a plurality of sidechains linked to the main chain, and wherein each respective sidechain is managed by a respective entity different from another entity that manages the main chain.

6. The system of claim 5, wherein each respective sidechain comprises a unique identification of the respective entity.

7. The system of claim 1, wherein the first type of the data comprises a banking type of data, an investment type of data, a retirement type of data, or a custom type of data.

8. A method performed by at least one processor, the method comprising:
monitoring, via the at least one processor, data input via an application;
determining, via the at least one processor, a first type of the data and a second type of the data;
executing, via the at least one processor, an audit trail routing system to route the first type of the data into a first audit trail of a plurality of audit trails based on the first type of the data and to route the second type of the data into a second audit trail of the plurality of audit trails based on the second type of the data;
storing, via the at least one processor, the first type of the data of the first audit trail in at least one first block of a digital distributed ledger system and the second type of the data of the second audit trail in at least one second block of the digital distributed ledger system;
authenticating access of an audit entity to the digital distributed ledger system; and
in response to authenticating the access of the audit entity to the digital distributed ledger system, providing the first audit trail to the audit entity via creating a report by querying the digital distributed ledger system, wherein the report comprises a regulatory compliance report.

9. The method of claim 8, wherein the first audit trail comprises a sidechain of the digital distributed ledger system linked to a main chain of the digital distributed ledger system.

10. The method of claim 9, wherein the sidechain of the digital distributed ledger system is dedicated to storing records of the first type of the data.

11. The method of claim 9, wherein each audit trail of the plurality of audit trails comprises a respective sidechain of a plurality of sidechains linked to the main chain, and wherein each respective sidechain is managed by a respective entity different from another entity that manages the main chain.

12. The method of claim 11, wherein each respective sidechain comprises a unique identification of the respective entity.

13. The method of claim 8, comprising distributing, via the at least one processor, the at least one first block and the at least one second block among nodes of the digital distributed ledger system, wherein the digital distributed ledger system is configured to immutably store the first type of the data of the first audit trail and the second type of the data of the second audit trail.

14. One or more non-transitory computer-readable storage media storing instructions that, when executed, cause at least one processor to perform operations comprising:
monitoring data input via an application;
determining a first type of the data and a second type of the data;
executing an audit trail routing system to route the first type of the data into a first audit trail of a plurality of audit trails based on the first type of the data and to route the second type of the data into a second audit trail of the plurality of audit trails based on the second type of the data;
storing the first type of the data of the first audit trail in at least one first block of a digital distributed ledger system and the second type of the data of the second audit trail in at least one second block of the digital distributed ledger system;
authenticating access of an audit entity to the digital distributed ledger system; and
in response to authenticating the access of the audit entity to the digital distributed ledger system, providing the first audit trail to the audit entity via creating a report by querying the digital distributed ledger system, wherein the report comprises a regulatory compliance report.

15. The one or more non-transitory computer-readable storage media of claim 14, wherein the first audit trail comprises a sidechain of the digital distributed ledger system linked to a main chain of the digital distributed ledger system.

16. The one or more non-transitory computer-readable storage media of claim 15, wherein the sidechain of the digital distributed ledger system is dedicated to storing records of the first type of the data.

17. The one or more non-transitory computer-readable storage media of claim 15, wherein each audit trail of the plurality of audit trails comprises a respective sidechain of a plurality of sidechains linked to the main chain, and wherein each respective sidechain is managed by a respective entity different from another entity that manages the main chain.

18. The one or more non-transitory computer-readable storage media of claim 17, wherein each respective sidechain comprises a unique identification of the respective entity, and wherein the unique identification of each respective sidechain comprises one or more cryptographic keys, one or more certificates of trust, or both.

* * * * *